US011560060B2

(12) United States Patent
Goto et al.

(10) Patent No.: US 11,560,060 B2
(45) Date of Patent: Jan. 24, 2023

(54) POWER SUPPLY DEVICE

(71) Applicant: KABUSHIKI KAISHA TOYOTA CHUO KENKYUSHO, Nagakute (JP)

(72) Inventors: Shigeaki Goto, Nagakute (JP); Naoki Yanagizawa, Nagakute (JP); Kyosuke Tanemura, Nagakute (JP); Shuji Tomura, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 167 days.

(21) Appl. No.: 16/495,696

(22) PCT Filed: Jan. 29, 2018

(86) PCT No.: PCT/JP2018/002674
§ 371 (c)(1),
(2) Date: Sep. 19, 2019

(87) PCT Pub. No.: WO2018/179774
PCT Pub. Date: Oct. 4, 2018

(65) Prior Publication Data
US 2020/0076206 A1 Mar. 5, 2020

(30) Foreign Application Priority Data
Mar. 31, 2017 (JP) .............................. JP2017-069613

(51) Int. Cl.
*B60L 3/00* (2019.01)
*H01M 10/44* (2006.01)
(Continued)

(52) U.S. Cl.
CPC ............... *B60L 3/00* (2013.01); *H01M 10/44* (2013.01); *H01M 50/572* (2021.01);
(Continued)

(58) Field of Classification Search
CPC ........... B60L 3/00; B60L 58/18; B60L 58/22; H01M 50/572; H01M 10/44;
(Continued)

(56) References Cited

U.S. PATENT DOCUMENTS

| | | | | |
|---|---|---|---|---|
| 5,554,919 A | * | 9/1996 | Uchida | H01M 10/44 320/132 |
| 6,043,628 A | * | 3/2000 | Perelle | H02J 7/0013 320/122 |

(Continued)

FOREIGN PATENT DOCUMENTS

| | | |
|---|---|---|
| JP | 2002-199601 A | 7/2002 |
| JP | 2009-142071 A | 6/2009 |

(Continued)

OTHER PUBLICATIONS

Feb. 27, 2018 International Search Report issued in International Application No. PCT/JP2018/002674.

(Continued)

*Primary Examiner* — Jack Chiang
*Assistant Examiner* — Aric Lin
(74) *Attorney, Agent, or Firm* — Oliff PLC

(57) ABSTRACT

A power supply device is provided with a disconnection means (AND element) for forcibly disconnecting a battery module from a series connection regardless of a gate signal. The power supply device forcibly disconnects partial battery modules from the series connection by the disconnection means (AND element) during powering by a power supply output, thereby performing control so that the accumulated discharge current amounts thereof per unit time become smaller than those of the other battery modules.

16 Claims, 11 Drawing Sheets

(51) Int. Cl.
*H02J 7/00* (2006.01)
*H01M 50/572* (2021.01)

(52) U.S. Cl.
CPC .......... *H02J 7/0016* (2013.01); *H02J 7/0021* (2013.01); *B60Y 2200/91* (2013.01); *H01M 2220/20* (2013.01)

(58) Field of Classification Search
CPC ............ H01M 2220/20; H01M 50/574; H02J 7/0016; H02J 7/0021; H02J 7/00; H02J 7/02; B60Y 2200/91; Y02E 60/10; Y02T 10/70
See application file for complete search history.

(56) References Cited

U.S. PATENT DOCUMENTS

| | | | |
|---|---|---|---|
| 2010/0141209 A1 | 6/2010 | Shiu et al. | |
| 2011/0057617 A1* | 3/2011 | Finberg | H02J 7/0021 320/118 |
| 2012/0013180 A1 | 1/2012 | Muto et al. | |
| 2012/0013304 A1 | 1/2012 | Murase et al. | |
| 2013/0249317 A1 | 9/2013 | Kang et al. | |
| 2015/0115736 A1* | 4/2015 | Snyder | H02J 7/0016 307/115 |

FOREIGN PATENT DOCUMENTS

| | | |
|---|---|---|
| JP | 2010-136603 A | 6/2010 |
| JP | 2010-172062 A | 8/2010 |
| JP | 2010-232104 A | 10/2010 |
| JP | 2010-239709 A | 10/2010 |
| JP | 2013-162633 A | 8/2013 |
| JP | 2013-179739 A | 9/2013 |
| JP | 2014-025738 A | 2/2014 |
| JP | 2014-025739 A | 2/2014 |
| JP | 2014-507921 A | 3/2014 |
| JP | 2016-154423 A | 8/2016 |
| JP | 2018-074709 A | 5/2018 |
| WO | 2018/079664 A1 | 5/2018 |
| WO | WO-2018145150 A1 * | 8/2018 ............. H02M 7/12 |

OTHER PUBLICATIONS

U.S. Appl. No. 16/343,880, filed Apr. 22, 2019 by Goto et al.
Oct. 1, 2019 International Preliminary Report on Patentability issued in International Patent Application No. PCT/JP2018/002674.
Dec. 8, 2020 Extended Search Report issued in European Patent Application No. 18778201.6.
May 11, 2021 Office Action issued in Japanese Patent Application No. 2017-069613.
Nov. 30, 2021 Office Action issued in Japanese Patent Application No. 2017-069613.
Sep. 28, 2022 Office Action issued in Chinese Patent Application No. 201880022076.0.

* cited by examiner (a)

(b)

POWER SUPPLY DEVICE

CROSS-REFERENCE TO RELATED APPLICATION

This application is a national stage application under 35 U.S.C. 371 of PCT Application No. PCT/JP2018/002674 having an international filing date of 29 Jan. 2018, which designated the United States, which PCT application claimed the benefit of priority right of Japanese Application No. 2017-069613 filed on 31 Mar. 2017, each of which are incorporated herein by reference in their entirely.

TECHNICAL FIELD

The present disclosure relates to a power supply device for controlling SOC.

BACKGROUND

A power supply device with a plurality of battery modules connected in series is used for supplying electric power to a load (for powering). When the batteries included in the battery modules are secondary batteries, performing charging (regeneration) from the load side to the batteries is feasible.

In such a power supply device, a configuration including a switching circuit for connecting or disconnecting each battery module to or from the load based on a gate signal is conventionally proposed. In such a circuit configuration, voltage control is performed by causing the switching circuit of each battery module to drive with the gate signal supplied via a delay circuit. In addition, a technique for eliminating the imbalance of charging rate (SOC) between battery modules by providing a balancing circuit to each battery module is also conventionally proposed.

Further, it is known that the charging rate (SOC) of the secondary battery can be accurately estimated if open circuit voltage is measurable. Accordingly, a method for estimating the SOC by measuring the voltage after stopping charging/discharging is conventionally proposed. However, in a case where the power supply device is used as a power source for an automotive vehicle, such as electric vehicle (EV), it is difficult to create an opportunity to completely stop the charging/discharging while traveling. Accordingly, measuring the open circuit voltage and estimating the SOC during traveling is difficult. Hence, an estimation method for accurately performing the estimation even in a state where the current is flowing is conventionally proposed. For example, remaining capacity estimation value $SOC_I$ of the battery module is calculated using an accumulation result $\Sigma I$ of measurement current values of the battery module. An internal resistance value Rdc is estimated based on a current change amount $\Delta I$ and a voltage change amount $\Delta V$. Then, a remaining capacity estimation value $SOC_V$ is calculated from an estimation value Va of the open circuit voltage obtained according to Ohm's law using the battery module voltage in a state where the current is flowing. Further, a remaining capacity output value $SOC_{OUT}$ is obtained according to $SOC_{OUT} = w \times SOC_I + (1-w) \times SOC_V$.

SUMMARY

Technical Problem

When the power supply device is controlled without using the balancing circuit, the current flowing to each battery module is the same. Therefore, when the battery capacity of a battery module is small, the SOC decreases earlier than those of other battery modules and accordingly there is a problem that the smaller-capacity battery module becomes unusable upon reaching the lower limit SOC. In addition, when the battery capacity is greatly varied due to deterioration or the like, the voltage of a battery having a smaller capacity decreases early in the configuration in which batteries are connected in series. Accordingly, there is a problem that the smaller-capacity battery becomes unusable upon reaching the lower limit voltage even when other batteries have sufficient residual capacity.

On the other hand, although providing the balancing circuit in each battery module can eliminate the imbalance of SOC, it is necessary to increase the current capacity of the balancing circuit, and there is a problem that the cost of the power supply device increases.

Moreover, when the prior art is applied to the estimation of SOC, there is a problem that the influence of error in estimating the internal resistance cannot be eliminated completely.

Solution to Problem

One aspect of the present disclosure is a power supply device including a plurality of battery modules having secondary batteries, wherein the battery modules are mutually connected in series according to a gate signal, disconnection means for forcibly disconnecting one or more of the battery modules from the series connection regardless of provision of the gate signal, and at the time of powering by power supply output one or more of the battery modules are forcibly disconnected from the series connection by the disconnection means, thereby performing control to make accumulated discharge current amounts thereof per unit time become smaller than those of other battery modules.

Another aspect of the present disclosure is a power supply device including a plurality of battery modules having secondary batteries, wherein the battery modules are mutually connected in series according to a gate signal, connection means for forcibly connecting one or more of the battery modules to the series connection regardless of provision of the gate signal, and at the time of regeneration by power supply output one or more of the battery modules are forcibly connected to the series connection by the connection means, thereby performing control to make accumulated charge current amounts thereof per unit time become larger than those of other battery modules.

Another aspect of the present disclosure is a power supply device including a plurality of battery modules having secondary batteries, wherein the battery modules are mutually connected in series according to a gate signal, disconnection means for forcibly disconnecting one or more of the battery modules from the series connection regardless of provision of the gate signal, and at the time of regeneration by power supply output one or more of the battery modules are forcibly disconnected from the series connection by the disconnection means, thereby performing control to make accumulated charge current amounts thereof per unit time become smaller than those of other battery modules.

Another aspect the present disclosure is a power supply device including a plurality of battery modules having secondary batteries, wherein the battery modules are mutually connected in series according to a gate signal, connection means for forcibly connecting one or more of the battery modules to the series connection regardless of provision of the gate signal, and at the time of powering by power supply output one or more of the battery modules are forcibly connected to the series connection by the connection means, thereby performing control to make accumulated discharge current amounts thereof per unit time become larger than those of other battery modules.

Preferably, a phase difference is provided to the gate signal for driving respective battery modules, and when the gate signal is successively transmitted to the battery modules with a delay time, the battery module is connected to or disconnected from the series connection.

Advantageous Effects of Invention

In a power supply device including a plurality of battery modules, the imbalance of SOC between the battery modules can be suppressed.

DESCRIPTION OF EMBODIMENTS

Figure 1:
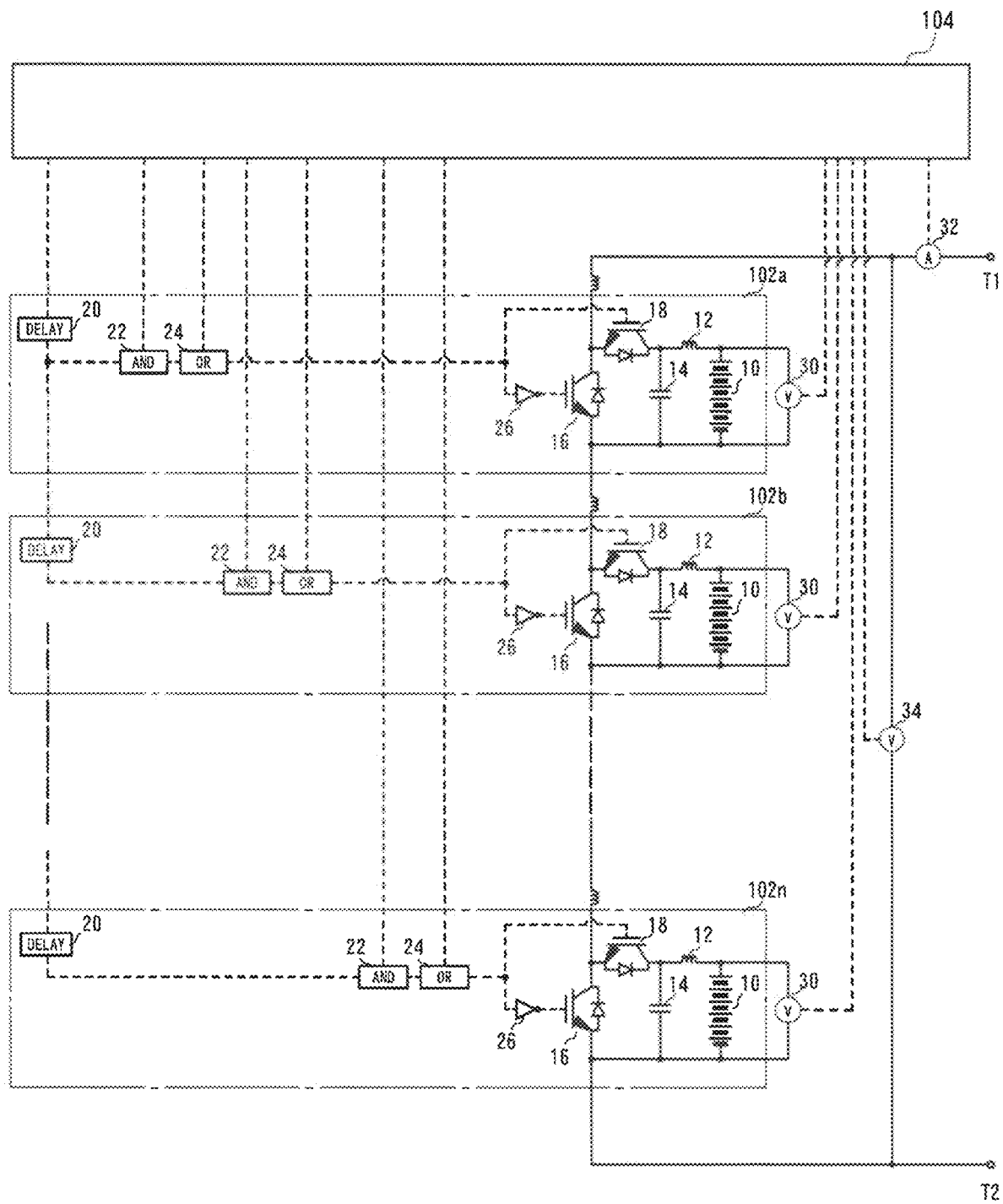
FIG. 1 is a diagram illustrating the configuration of a power supply device according to an exemplary embodiment.

A power supply device 100 according to the present embodiment is configured to include battery modules 102 and a control unit 104, as illustrated in FIG. 1. The power supply device 100 is configured to include a plurality of the battery modules 102 (102a, 102b, . . . 102n). The plurality of battery modules 102 can be mutually connected in series under the control of the control unit 104. The plurality of battery modules 102 included in the power supply device 100 can supply electric power (for powering) to a load (not illustrated) connected between terminals T1 and T2, or can be charged by electric power from a power source (not illustrated) connected between the terminals T1 and T2 (regeneration).

The battery module 102 is configured to include a battery 10, a choke coil 12, a capacitor 14, a first switch element 16, a second switch element 18, a delay circuit 20, an AND element 22, an OR element 24, and a NOT element 26. In the present embodiment, each battery module 102 has the same configuration.

The battery 10 includes at least one secondary battery. The battery 10 is, for example, configured to include a plurality of lithium ion batteries, nickel metal hydride batteries, or the like connected in series or/and in parallel. The choke coil 12 and the capacitor 14 constitute a smoothing circuit (low-pass filter circuit) that smooths the output from the battery 10 and outputs it. That is, since secondary batteries are used to constitute the battery 10, in order to suppress deterioration of the battery 10 due to increase of internal resistance loss, an RLC filter is formed by the battery 10, the choke coil L, and the capacitor 14 to achieve leveling of current.

The choke coil 12 and the capacitor 14 are not essential configurations and are not necessarily provided. Further, in the battery module 102, arrangement positions (connection positions) of the choke coil L and the battery 10 may be interchanged. Further, the second switch element 18 may be disposed on the opposite side of output terminals with respect to the first switch element 16. That is, any configuration capable of outputting the voltage of the battery 10 (the capacitor 14) to the output terminals by switching operations of the first switch element 16 and the second switch element 18 is employable. The arrangement of respective elements and electric components can be changed appropriately.

The first switch element 16 includes a switching element for short-circuiting the output terminals of the battery 10. In the present embodiment, the first switch element 16 has a configuration in which a reflux diode is connected in parallel with a field effect transistor being the switching element. The second switch element 18 is serially connected with the battery 10 between the battery 10 and the first switch element 16. In the present embodiment, the second switch element 18 has a configuration in which a reflux diode is connected in parallel with a field effect transistor being the switching element. The first switch element 16 and the second switch element 18 are switching controlled by a gate signal from the control unit 104. In the present embodiment, although the first switch element 16 and the second switch element 18 are constituted by field effect transistors, other switching elements may be employed.

The delay circuit 20 is a circuit that delays the gate signal input from the control unit 104 to the battery module 102a by a predetermined time. In the power supply device 100, each battery module 102 (102a, 102b, . . . 102n) is provided with the delay circuit 20, so that these delay circuits are connected in series. Accordingly, the gate signal input from the control unit 104 is successively delayed by the predetermined time when it is input to respective battery modules 10 (102a, 102b, . . . 102n).

The AND element 22 constitutes a disconnection means for forcibly disconnecting the battery module 102a from the series connection state according to a forced disconnection signal from the control unit 104. Further, the OR element 24 constitutes a connection means for forcibly connecting the battery module 102a to the series connection state according to a forced connection signal from the control unit 104.

Although in the present embodiment the AND element 22 and the OR element 24 is connected to the branch point after the delay circuit 20, the AND element 22 and the OR element 24 may be connected to the branch point before the delay circuit 20. That is, any configuration is employable if the gate signal is successively transmitted to the delay circuits 20 of respective battery modules 102 while it is delayed by the predetermined time.

[Normal Control]

Hereinafter, control of the power supply device 100 will be described with reference to FIG. 2. In a normal control state, the control unit 104 inputs the forced disconnection signal of high (H) level to the AND element 22 of each battery module 102 (102a, 102b, . . . 102n). Further, the control unit 104 inputs the forced connection signal of low (L) level to the OR element 24 of each battery module 102 (102a, 102b, . . . 102n). Accordingly, an output signal from the delay circuit 20 is input to a gate terminal of the first switch element 16 via the NOT element 26 as an inverted signal, and the output signal from the delay circuit 20 is input to a gate terminal of the second switch element 18 via the AND element 22 and the OR element 24.

Figure 2:
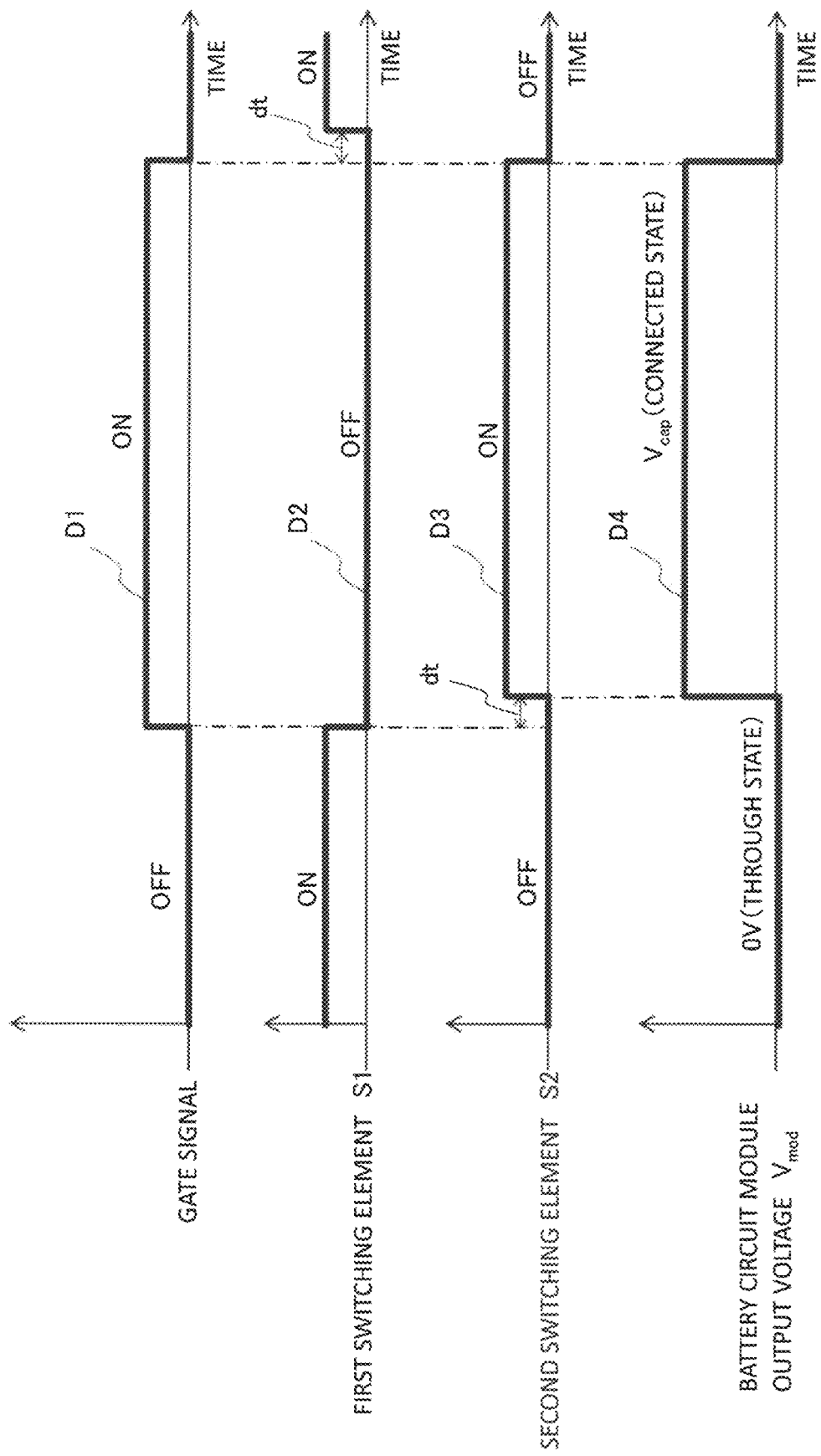
FIG. 2 is a timing diagram illustrating battery module control according to an exemplary embodiment.

FIG. 2 is a timing diagram relating to the operation of the battery module 102a. FIG. 2 illustrates the pulse waveform of a gate signal D1 that drives the battery module 102a, a rectangular wave D2 indicating the switching state of the first switch element 16, a rectangular wave D3 indicating the switching state of the second switch element 18, and a waveform D4 indicating voltage $V_{mod}$ output from the battery module 102a.

In an initial state of the battery module 102a; that is, in a state where the gate signal is not output, the state of the first switch element 16 is ON and the state of the second switch element 18 is OFF. Then, when the control unit 104 inputs the gate signal to the battery module 102a, the battery module 102a is switching controlled by PWM control. In this switching control, the first switch element 16 and the second switch element 18 are alternately switched to ON state/OFF state.

As illustrated in FIG. 2, when the gate signal D1 is output from the control unit 104, the first switch element 16 and the second switch element 18 of the battery module 102a are driven according to the gate signal D1. The first switch element 16 is switched from the ON state to the OFF state in response to the falling of a signal from the NOT element 26 according to the rising of the gate signal D1. Further, the first switch element 16 is switched from the OFF state to the ON state with a slight delay (dead time dt) in response to the falling of the gate signal D1.

On the other hand, the second switch element 18 is switched from the OFF state to the ON state with a slight delay (dead time dt) from the rising of the gate signal D1. The second switch element 18 is switched from the ON state to the OFF state simultaneously with the falling of the gate signal D1. In this manner, the first switch element 16 and the second switch element 18 are switching controlled so that they are alternately switched between the ON state and the OFF state.

The reason why the first switch element 16 operates with the slight delay (dead time dt) at the time of falling of the gate signal D1 and the second switch element 18 operates with the slight delay (dead time dt) at the time of rising of the gate signal D1 is to prevent the first switch element 16 and the second switch element 18 from operating simultaneously. That prevents the first switch element 16 and the second switch element 18 from being simultaneously turned on and the positive and negative electrodes of battery 10 from being short-circuited. The dead time dt for delaying the operation is, for example, set to 100 ns, but can be set appropriately. During the dead time dt, reflux occurs in the diode and it is brought into a state similar to the state where the switching element in parallel with the diode causing the reflux is turned on.

Figure 3:
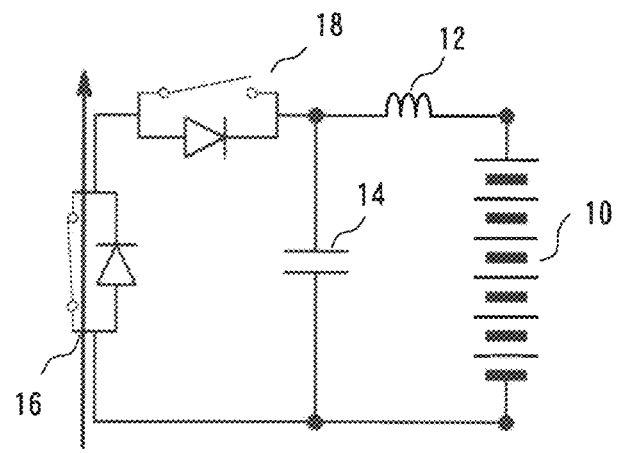
FIG. 3 is a diagram illustrating the function of a battery module according to an exemplary embodiment.
Figure 3:
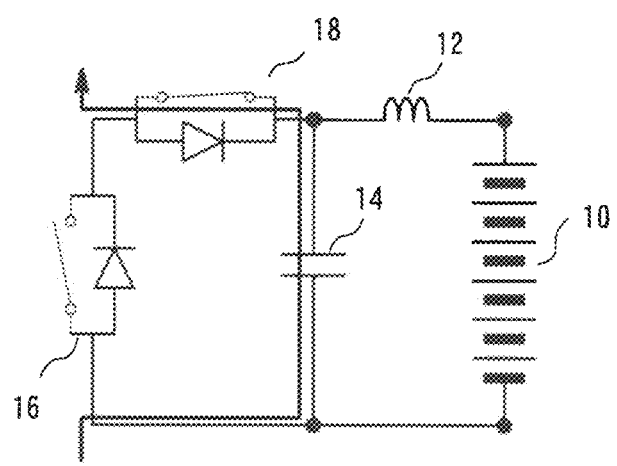

By the above-mentioned control, in the battery module 102a, when the gate signal D1 is OFF (that is, when the first switch element 16 is ON and the second switch element 18 is OFF), the capacitor 14 is disconnected from the output terminals of the battery module 102a. Accordingly, no voltage is output from the battery module 102a to the output terminals. In this state, as illustrated in FIG. 3(a), the battery 10 (the capacitor 14) of the battery module 102a is in a through state where it is bypassed.

When the gate signal D1 is ON (that is, when the first switch element 16 is OFF and the second switch element 18 is ON), the capacitor 14 is connected to the output terminals of the battery module 102a. Accordingly, the voltage from the battery module 102a is output to the output terminals. In this state, as illustrated in FIG. 3(b), the voltage $V_{mod}$ is output to the output terminals via the capacitor 14 in the battery module 102a.

Referring back to FIG. 1, control of the power supply device 100 by the control unit 104 will be described. The control unit 104 controls the battery modules 102 entirely. That is, by controlling the plurality of battery modules 102a, 102b, . . . 102n, the output voltage of the power supply device 100 is controlled.

The gate signal is successively transmitted to the delay circuit 20 included in the battery module 102a, the delay circuit 20 included in the battery module 102b . . . , and to those in the downstream battery modules 102. That is, the gate signal is successively delayed by a predetermined delay time when it is transmitted from the upstream side of the battery modules 102 connected in series in the power supply device 100 to the downstream side thereof.

In the normal control state, the forced disconnection signal of high (H) level is input from the control unit 104 to the AND element 22, and the forced connection signal of low (L) level is input from the control unit 104 to the OR element 24. Therefore, the gate signal output from the delay circuit 20 of each battery module 102 is directly input to the gate terminal of the second switch element 18, and a signal obtained by inverting the gate signal is input to the gate terminal of the first switch element 16. Accordingly, when the gate signal is at the high (H) level, the state of the first switch element 16 is OFF and the state of the second switch element 18 is ON. When the gate signal is at the low (L) level, the state of the first switch element 16 is ON and the state of the second switch element 18 is OFF.

That is, when the gate signal is at the high (H) level, the capacitor 14 and battery 10 in the battery module 102 is in a state where they are connected in series with the capacitor 14 and battery 10 in other battery modules 102. When the gate signal is at the low (L) level, the capacitor 14 and battery 10 in the battery module 102 is in the through state where they are disconnected from the capacitor 14 and battery 10 in other battery modules 102.

Figure 4:
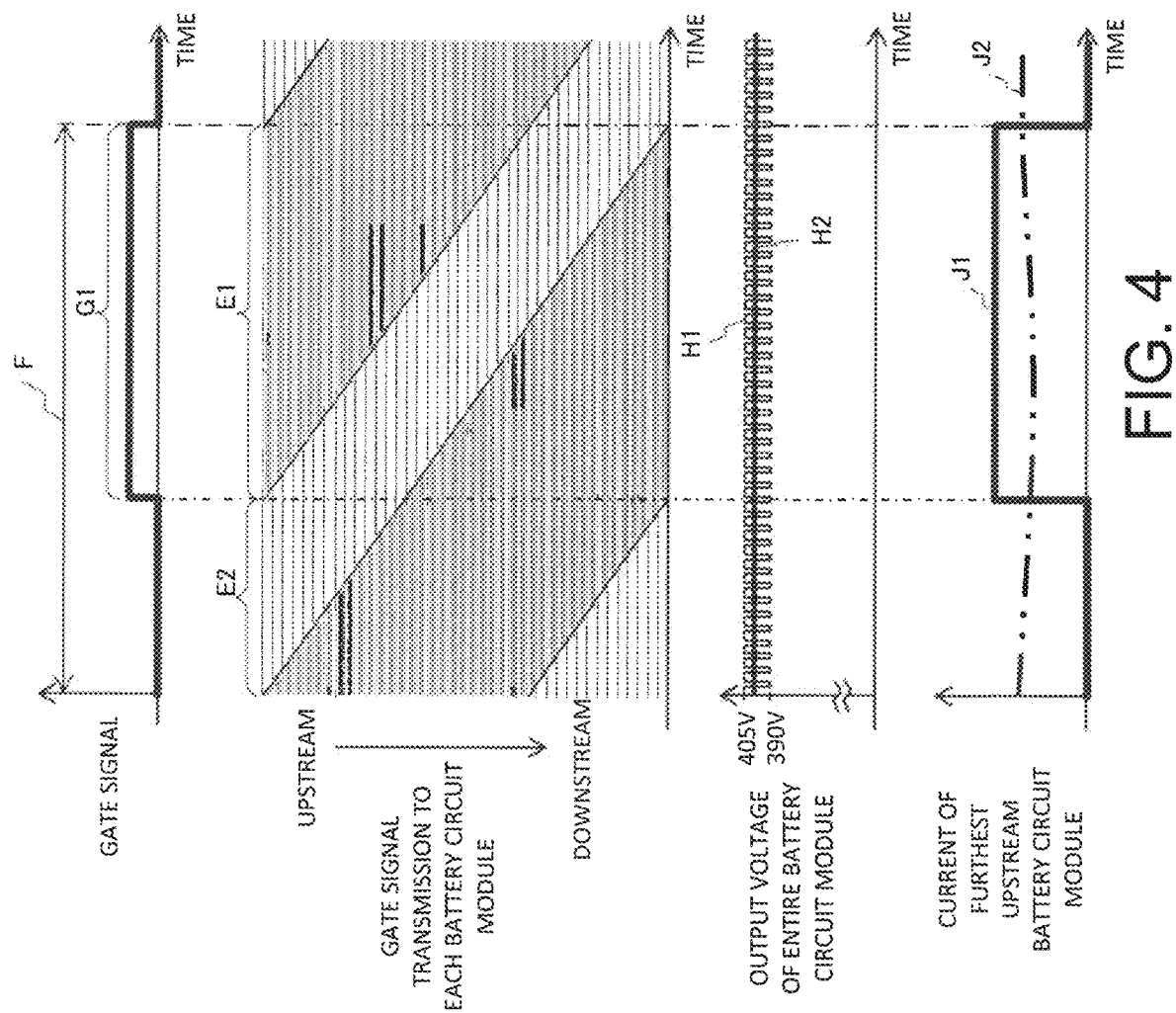
FIG. 4 is a timing diagram illustrating control of the power supply device according to an exemplary embodiment.

FIG. 4 illustrates a control sequence for outputting electric power by successively connecting a predetermined number of battery modules in series, of the battery modules 102a, 102b, . . . 102n. As illustrated in FIG. 4, according to the gate signal, the battery modules 102a, 102b, . . . 102n are sequentially driven from the upstream side to the downstream side with the predetermined delay time. In FIG. 4, duration E1 indicates a state (connected state) of the battery modules 102a, 102b, . . . 102n, in which the first switch element 16 is OFF and the second switch element 18 is ON, and the battery modules 102a, 102b, . . . 102n are outputting voltages from the output terminals. Further, duration E2 indicates a state (through state) of the battery modules 102a, 102b, . . . 102n, in which the first switch element 16 is ON and the second switch element 18 is OFF, and the battery modules 102a, 102b, . . . 102n are outputting no voltage to the output terminals. In this manner, the battery modules 102a, 102b, . . . 102n are successively driven with the predetermined delay time.

Setting of the gate signal and the delay time of the gate signal will be described with reference to FIG. 4. Period F of the gate signal is set by summing the delay times of the battery modules 102a, 102b, . . . 102n. Therefore, the frequency of the gate signal decreases as the delay time becomes longer. To the contrary, the frequency of the gate signal increases as the delay time becomes shorter. Further, the delay time for delaying the gate signal is adequately set according to specifications required for the power supply device 100.

ON time ratio G1 (duty ratio D) in the period F of the gate signal; that is, the ratio of the time during which the gate signal is at the high (H) level in the period F, can be calculated by dividing the target value of the output voltage of the power supply device 100 by the total voltage of the battery modules 102a, 102b, . . . 102n (i.e., the battery voltage of the battery module 102×the number of battery modules). That is, when the voltages of respective battery modules 102 are equal to each other, the ON time ratio G1 is equal to (the output voltage of the power supply device 100)/(the battery voltage of the battery module 102×the number of the battery modules 102). Strictly speaking, since the ON time ratio is likely to deviate by the dead time dt, it is preferable to correct the ON time ratio by feedback or feedforward as generally performed in chopper circuits.

When the output voltage of all the battery modules 102a, 102b, . . . 102n is equal, the total voltage of the battery modules 102a, 102b, . . . 102n is expressed as the value obtained by multiplying the battery voltage of the battery module 102 by the number of the battery modules 102 in the connected state, as described above. If the output voltage of the power supply device 100 is a value divisible by the battery voltage of one battery module 102, at the moment when the battery module 102 is switched from the through state to the connected state, another battery module 102 is switched from the connected state to the through state. Therefore, the entire output voltage of the battery modules 102 does not fluctuate.

However, if the output voltage of the power supply device 100 is a value not divisible by the battery voltage of each battery module 102, the output voltage of the power supply device 100 does not match the total voltage of the battery modules 102a, 102b, . . . 102n. In other words, the output voltage (the entire output voltage) of the power supply device 100 comes to fluctuate. However, the fluctuation amplitude at this time is the voltage of one battery module, and the fluctuation period is equal to a value obtained by dividing the period F of the gate signal by the number of the battery modules 102. If several dozen battery modules 102 are connected in series, the entire parasitic inductance of the power supply device 100 is large in magnitude, and consequently this voltage fluctuation can be filtered to obtain a stable output voltage of the power supply device 100.

Next, specific examples will be described. In FIG. 4, for example, it is assumed that a desired output voltage as the power supply device 100 is 400 V, the battery voltage of each battery module 102 is 15 V, the number of the battery modules 102a, 102b, . . . 102n is 40, and the delay time is 200 ns. This case corresponds to a case where the output voltage (400 V) of the power supply device 100 is not divisible by the battery voltage of the battery module 102 (15 V).

Since the period F of the gate signal can be calculated by multiplying delay time by the number of battery modules, the period F is 8 μs (=200 ns×40) as derived from these numerical values. Accordingly, the gate signal is shaped as a rectangular wave having a frequency corresponding to 125 kHz. Further, since the ON time ratio G1 of the gate signal can be calculated by dividing the output voltage of the power supply device 100 by (the battery voltage of the battery module 102×the number of the battery modules 102), the ON time ratio G1 is 0.67 (≈400 V/(15 V×40)).

When the battery modules 102a, 102b, . . . 102n are successively driven based on these numerical values, the power supply device 100 can generate output voltage H1 having a rectangular waveform as illustrated in FIG. 4. The output voltage H1 fluctuates between 390 V and 405 V. More specifically, the output voltage H1 fluctuates at a period calculated by dividing the period F of the gate signal by the number of battery modules; that is, 8 μs/40=200 ns (corresponding to 5 MHz). Since this fluctuation is filtered by the parasitic inductance of the wiring of the battery modules 102a, 102b, . . . 102n, the power supply device 100 outputs, as a whole, output voltage H2 of approximately 400 V.

In the connected state, current flows through the capacitor 14 of each battery module 102, and waveform J1 of the current through the second switch element 18 is a rectangular wave, as illustrated in FIG. 4. Further, since the battery 10 and the capacitor 14 constitute the RLC filter, filtered and leveled current J2 flows in the battery 10. Thus, the current waveform is uniform in all the battery modules 102a, 102b, . . . 102n, and current can be output equally from all the battery modules 102a, 102b, . . . 102n.

As described above, when controlling the power supply device 100, the gate signal output to the furthest upstream side battery module 102a is delayed for a predetermined time and is output to the battery module 102b on the downstream side. This gate signal is further delayed for the predetermined time and transmitted to the next battery module 102 on the downstream side. Therefore, the battery modules 102a, 102b, . . . 102n successively output voltages while being delayed for the predetermined time. Then, these voltages are summed up to obtain an output voltage as the power supply device 100. Thereby, the power supply device 100 can output a desired voltage.

According to the power supply device 100, a power conversion circuit such as a boosting circuit is unnecessary, the circuit configuration can be simplified, and size and cost can be reduced. In addition, the balancing circuit or the like that causes a power loss is unnecessary, and the efficiency of the power supply device 100 can be improved. Further, since voltages are output substantially equally from the plurality of battery modules 102a, 102b, . . . 102n, it is possible to prevent a specific battery module 102 from being driven in a concentrated manner, and the internal resistance loss of the power supply device 100 can be reduced.

Further, adjusting the ON time ratio G1 makes it easy to cope with the desired voltage, and the versatility of the power supply device 100 can be improved. In particular, even when a failure occurs in the battery modules 102a, 102b, . . . 102n and an unusable battery module 102 is present, it is possible to obtain the desired voltage by using normal battery modules 102 while excluding the failed battery module 102 if the period F of the gate signal, the ON time ratio G1, and the delay time are set again. That is, even when a failure occurs in the battery modules 102a, 102b, . . . 102n, continuously outputting the desired voltage is feasible.

Further, since the frequency of the gate signal becomes a lower frequency when the delay time for delaying the gate signal is set to be longer, the switching frequency of each of the first switch element 16 and the second switch element 18 is also lowered. Thus, the switching loss can be reduced, and the power conversion efficiency can be improved. To the contrary, since the frequency of the gate signal becomes a higher frequency when the delay time for delaying the gate signal is set to be shorter, the frequency of voltage fluctuation increases, filtering becomes easy, and a stable voltage can be obtained. In addition, leveling the current fluctuation by the RLC filter becomes easy. In this manner, by adjusting the delay time for delaying the gate signal, it is possible to provide the power supply device 100 according to required specifications and performances.

In the present embodiment, the delay circuit 20 capable of transmitting the gate signal while delaying it is provided in each battery module 102. However, the configuration is not limited to this example. For example, each battery module 102 may be configured not to include the delay circuit 20. In this case, the control unit 104 can be configured to individually output the gate signal to the AND element 22 and the OR element 24 of each battery module 102. That is, the control unit 104 outputs the gate signal at predetermined intervals to respective battery modules 102a, 102b, . . . 102n. In this case, regardless of arrangement positions of the battery modules 102a, 102b, . . . 102n, the number of the battery modules 102 brought into the connected state is controlled by outputting the gate signal to the battery modules 102a, 102b, . . . 102n at predetermined intervals in an arbitrary order. For example, it is possible to control in such a manner that the gate signal is first output to the battery module 102b to cause the battery module 102b to drive, and after a predetermined time, the gate signal is output to the battery module 102a to cause the battery module 102a to drive.

The above-mentioned configuration brings advantages of not requiring the delay circuit 20, further simplifying the power supply device 100 in configuration, and suppressing manufacturing cost and power consumption.

[Forced Disconnection Control]

Next, control for forcibly disconnecting selected ones of the plurality of battery modules 102 (102a, 102b, . . . 102n) will be described. The control unit 104 outputs a forced disconnection signal of low (L) level to the AND element 22 of the battery module 102 to be forcibly disconnected. Further, the control unit 104 outputs a forced connection signal of low (L) level to the OR element 24 of this battery module 102.

As a result, the output of the AND element 22 becomes low (L) level. The input of the gate terminal of the first switch element 16 by the NOT element 26, via the OR element 24, becomes high (H) level. The input of the gate terminal of the second switch element 18 becomes low (L) level. Accordingly, the state of the first switch element 16 is constantly ON, the state of the second switch element 18 is constantly OFF, and the battery module 102 is brought into a forcibly disconnected state (through state) regardless of the state of the gate signal.

Figure 5:
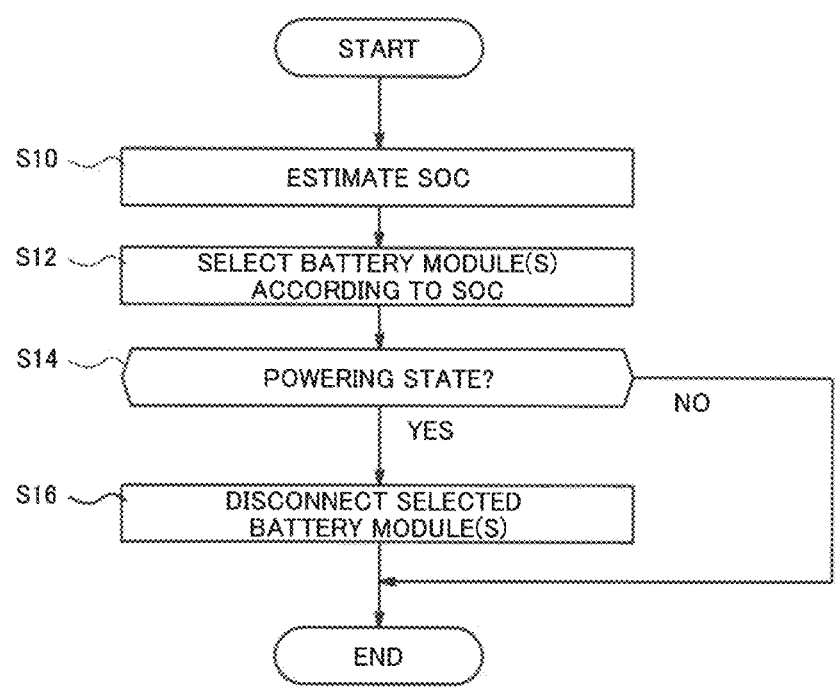
FIG. 5 is a flowchart illustrating forced disconnection control in a powering state according to an exemplary embodiment.

Such forced disconnection control can be used in the control for suppressing the imbalance of SOC between the battery modules 102, which is performed in the power supply device 100. FIG. 5 is a flowchart illustrating SOC balance adjustment control. Hereinafter, control for suppressing the imbalance of SOC between the battery modules 102 at the time of powering will be described with reference to FIG. 5.

In step S10, estimation of the SOC is performed for all the battery modules 102 included in the power supply device 100. The control unit 104 performs processing for estimating the SOC of each battery module 102 based on outputs of a voltage sensor 30 provided in each battery module 102 and configured to detect and output the output voltage of the battery module 102, a current sensor 32 configured to detect and output the output current of the power supply device 100, and a voltage sensor 34 configured to detect and output the output voltage of the power supply device 100. Details of the SOC estimation processing will be described in detail below.

In step S12, the SOCs of respective battery modules 102 are compared, and each battery module 102 having a relatively low SOC is selected. The control unit 104 compares the SOCs of respective battery modules 102 estimated in step S10 and selects one or more battery modules 102 that are relatively low in SOC among all the battery modules 102.

For example, of all the battery modules 102 included in the power supply device 100, a predetermined number of battery modules 102 may be selected in ascending order of SOC. Alternatively, a reference value of SOC may be determined in advance and each battery module 102 whose SOC is equal to or less than the reference value may be selected. However, the method for selecting the battery modules 102 is not limited to these examples, and any other method is employable if it is effective in suppressing the unbalance of SOC. For example, the voltage of each battery module 102 may be measured and the battery modules 102 may be selected in ascending order of voltage.

In step S14, it is determined whether the state of the power supply output of the power supply device 100 is powering or regenerative. The control unit 104 refers to the direction of the current detected by the current sensor 32 in discrimination between the powering state in which electric power is supplied from the power supply device 100 to the load and the regenerative state in which electric power is input from an external power source to the power supply device 100. If the state is powering, the processing proceeds to step S16, and if the state is regenerative, the processing is terminated.

In step S16, forced disconnection processing for the battery module 102 is performed. The control unit 104 outputs a forced disconnection signal of low (L) level to the AND element 22 of each battery module 102 selected in step S12. As a result, the selected battery module 102 is forcibly disconnected from the series connection and does not contribute to the output of the power supply device 100 in this state.

With the above-described control, of the battery modules 102 included in the power supply device 100, each battery module 102 having a relatively low SOC becomes smaller in power consumption amount (accumulated discharge current amounts thereof per unit time), and the imbalance of SOC can be eliminated. As a result, the charging energy of all the battery modules 102 included in the power supply device 100 can be efficiently used up.

Further, it is also possible to perform control for eliminating the imbalance of SOC at the regenerative state, not at the powering state. In this case, performing control for forcibly disconnecting the battery module 102 having a relatively high SOC and preferentially regenerating electric power to the battery module 102 having a relatively low SOC can eliminate the imbalance of SOC.

Figure 6:
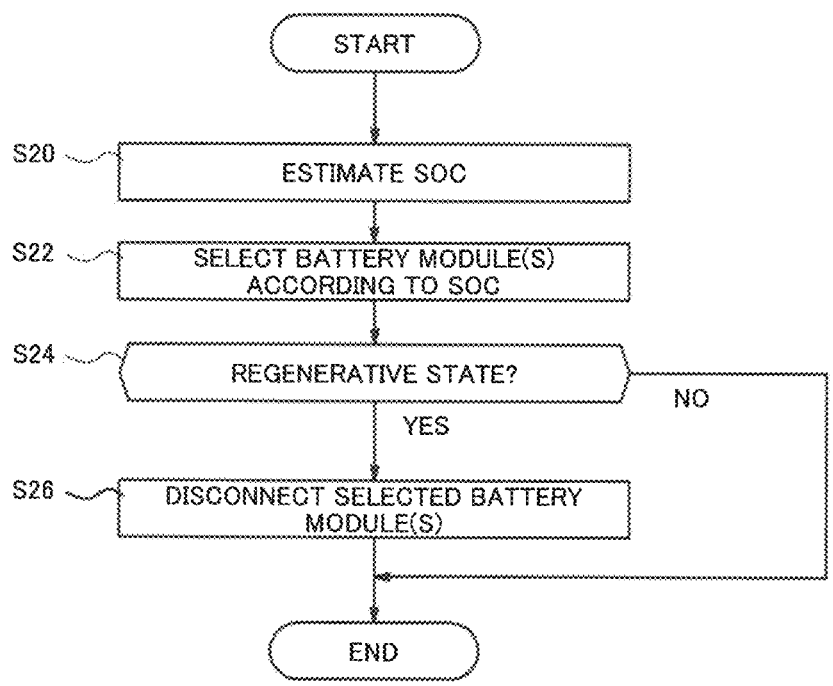
FIG. 6 is a flowchart illustrating forced disconnection control in a regenerative state according to an exemplary embodiment.

FIG. 6 is a flowchart illustrating SOC balance adjustment control. Hereinafter, control for suppressing the imbalance of SOC between the battery modules 102 at the time of regeneration will be described with reference to FIG. 6.

In step S20, estimation of the SOC, is performed for all the battery modules 102 included in the power supply device 100. The control unit 104 performs processing for estimating the SOC of each battery module 102 based on outputs of the voltage sensor 30 provided in each battery module 102 and configured to detect and output the output voltage of the battery module 102, the current sensor 32 configured to detect and output the output current of the power supply device 100, and the voltage sensor 34 configured to detect and output the output voltage of the power supply device 100. Details of the SOC estimation processing will be described in detail below.

In step S22, the SOCs of respective battery modules 102 are compared, and each battery module 102 having a relatively high SOC is selected. The control unit 104 compares the SOCs of respective battery modules 102 estimated in step S20 and selects one or more battery modules 102 that are relatively high in SOC among all the battery modules 102.

For example, of all the battery modules 102 included in the power supply device 100, a predetermined number of battery modules 102 may be selected in descending order of SOC. Alternatively, a reference value of SOC may be determined in advance and each battery module 102 whose SOC is equal to or higher than the reference value may be selected. However, the method for selecting the battery modules 102 is not limited to these examples, and any other method is employable if it is effective in suppressing the imbalance of SOC.

In step S24, it is determined whether the state of the power supply output of the power supply device 100 is powering or regenerative. The control unit 104 refers to the direction of the current detected by the current sensor 32 in discrimination between the powering state in which electric power is supplied from the power supply device 100 to the load, and the regenerative state in which electric power is input from an external power source to the power supply device 100. If the state is regenerative, the processing proceeds to step S26, and if the state is powering, the processing is terminated.

In step S26, forced disconnection processing for the battery module 102 is performed. The control unit 104 outputs a forced disconnection signal of low (L) level to the AND element 22 of each battery module 102 selected in step S22. As a result, the selected battery module(s) 102 are forcibly disconnected from the series connection and do not supply regenerative electric power to the power supply device 100 in this state.

With the above-described control, of the battery modules 102 included in the power supply device 100, each battery module 102 having a relatively high SOC becomes lower in electric power supply (accumulated charge current amounts thereof per unit time), and the imbalance of SOC can be can eliminated. As a result, the charging for all the battery modules 102 included in the power supply device 100 can be performed in a well-balanced manner. In addition, the battery module(s) 102 having a smaller charging capacity can be prevented from being overcharged.

At the time of forced disconnection control, the delay time of the gate signal is set to 0. Further, duty D of the gate signal is set according to numerical formula (1). Here, Vmod represents the voltage of the battery module 102, and Vmod_disconnection represents the voltage of the battery module 102 to be subjected to the forced disconnection.

[Numerical formula 1]

$$D = \frac{\text{Output voltage commanded}}{\sum(V\text{mod}) - \sum(V\text{mod\_disconnection})} \quad (1)$$

[Forced Connection Control]

Next, control for forcibly connecting selected one(s) of the plurality of battery modules 102 (102a, 102b, . . . 102n) will be described. The control unit 104 outputs a forced connection signal of high (H) level to the OR element 24 of the battery module 102 to be forcibly connected.

As a result, the output of the OR element 24 becomes high (H) level. The input of the gate terminal of the first switch element 16 by the NOT element 26 becomes low (L) level. The input of the gate terminal of the second switch element 18 becomes high (H) level. Accordingly, the state of the first switch element 16 is constantly OFF, the state of the second switch element 18 is constantly ON, and in this state the battery module 102 is forcibly connected to the series connection regardless of the state of the gate signal.

Figure 7:
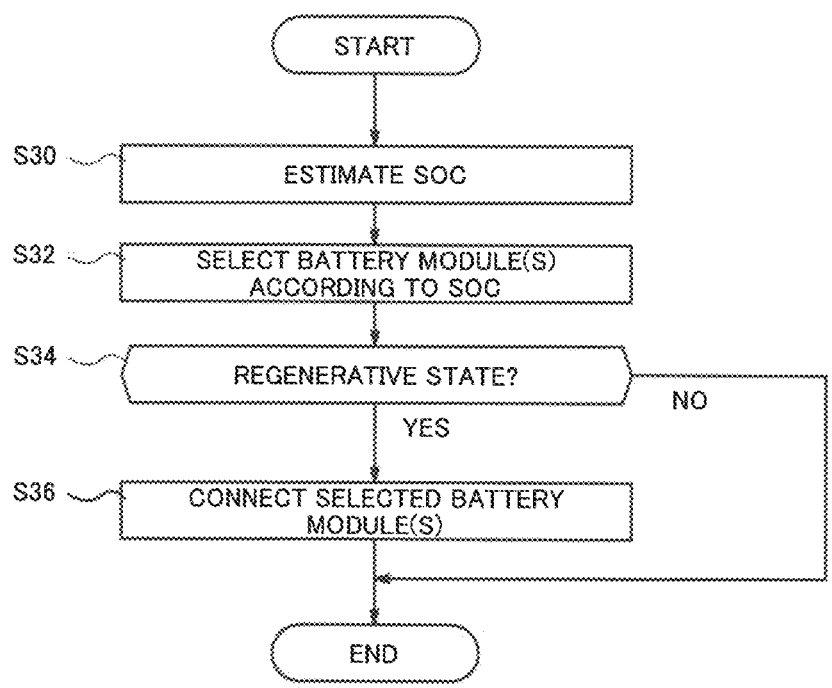
FIG. 7 is a flowchart illustrating forced connection control in the regenerative state according to an exemplary embodiment.

Such forced connection control can be used in the control for suppressing the imbalance of SOC between the battery modules 102, which is performed in the power supply device 100. FIG. 7 is a flowchart illustrating SOC balance adjustment control. Hereinafter, control for suppressing the imbalance of SOC between the battery modules 102 at the time of regeneration will be described with reference to FIG. 7.

In step S30, estimation of SOC is performed for all the battery modules 102 included in the power supply device 100. The control unit 104 performs processing for estimating the SOC of each battery module 102 based on outputs of the voltage sensor 30 provided in each battery module 102 and configured to detect and output the output voltage of the battery module 102, the current sensor 32 configured to detect and output the output current of the power supply device 100, and the voltage sensor 34 configured to detect and output the output voltage of the power supply device 100. Details of the SOC estimation processing will be described in detail below.

In step S32, the SOCs of respective battery modules 102 are compared, and each battery module 102 having a relatively low SOC is selected. The control unit 104 compares the SOCs of respective battery modules 102 estimated in step S30 and selects one or more battery modules 102 that are relatively low in SOC among all the battery modules 102. Specifically, processing may be performed in the same manner as in step S12.

In step S34, it is determined whether the state of the power supply output of the power supply device 100 is powering or regenerative. The control unit 104 refers to the direction of the current detected by the current sensor 32 in discrimination between the powering state in which electric power is supplied from the power supply device 100 to the load and the regenerative state in which electric power is input from an external power source to the power supply device 100. If the state is regenerative, the processing proceeds to step S36, and if the state is powering, the processing is terminated.

In step S36, forced connection processing for the battery module 102 is performed. The control unit 104 outputs a forced connection signal of high (H) level to the OR element 24 of each battery module 102 selected in step S32. As a result, the selected battery module 102 is forcibly connected to the series connection and contributes to charging of the power supply device 100 using regenerative electric power in this state.

With the above-described control, of the battery modules 102 included in the power supply device 100, charging of each battery module 102 having a relatively low SOC is preferentially performed using regenerative electric power, the accumulated charge current amounts thereof per unit time becomes larger, and the imbalance of SOC can be eliminated. As a result, charging of all the battery modules 102 included in the power supply device 100 can be performed in a well-balanced manner.

Further, it is also possible to perform control for eliminating the imbalance of SOC at the powering state, not at the regenerative state. In this case, performing control for forcibly connecting the battery module 102 having a relatively high SOC and increasing power consumption amount of the battery module 102 having a relatively high SOC can eliminate the imbalance of SOC.

Figure 8:
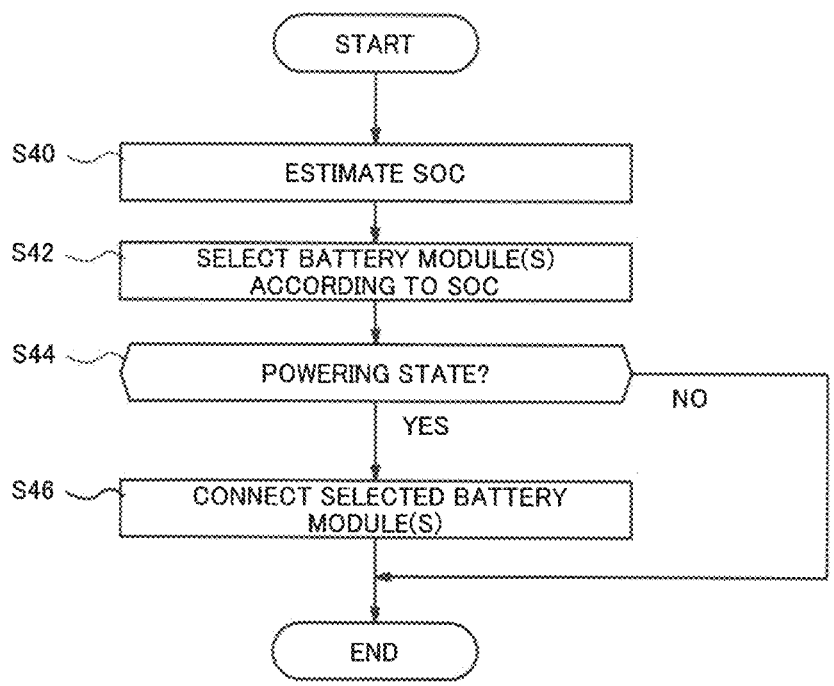
FIG. 8 is a flowchart illustrating forced connection control in the powering state according to an exemplary embodiment.

FIG. 8 is a flowchart illustrating SOC balance adjustment control. Hereinafter, control for suppressing the imbalance of SOC between the battery modules 102 at the time of powering will be described with reference to FIG. 8.

In step S40, estimation of the SOC is performed for all the battery modules 102 included in the power supply device 100. The control unit 104 performs processing for estimating the SOC of each battery module 102 based on outputs of the voltage sensor 30 provided in each battery module 102 and configured to detect and output the output voltage of the battery module 102, the current sensor 32 configured to detect and output the output current of the power supply device 100, and the voltage sensor 34 configured to detect and output the output voltage of the power supply device 100. Details of the SOC estimation processing will be described in detail below.

In step S42, the SOCs of respective battery modules 102 are compared, and each battery module 102 having a relatively high SOC is selected. The control unit 104 compares the SOCs of respective battery modules 102 estimated in step S40 and selects one or more battery modules 102 that are relatively high in SOC among all the battery modules 102. Specifically, processing may be performed in the same manner as in step S22.

In step S44, it is determined whether the state of the power supply output of the power supply device 100 is powering or regenerative. The control unit 104 refers to the direction of the current detected by the current sensor 32 in discrimination between the powering state in which electric power is supplied from the power supply device 100 to the load and the regenerative state in which electric power is input from an external power source to the power supply device 100. If the state is powering, the processing proceeds to step S46, and if the state is regenerative, the processing is terminated.

In step S46, forced connection processing for the battery molecule(s) 102 is performed. The control unit 104 outputs a forced connection signal of high (H) level to the OR element 24 of each battery module 102 selected in step S42. As a result, the selected battery module(s) 102 are forcibly connected to the series connection and contribute to electric power supply from the power supply device 100.

With the above-described control, of the battery modules 102 included in the power supply device 100, each battery module 102 having a relatively high SOC becomes larger in electric power supply (accumulated discharge current amounts thereof per unit time), and the imbalance of SOC can be can eliminated. As a result, the charging energy of all the battery modules 102 included in the power supply device 100 can be efficiently used up.

At the time of forced connection control, the delay time of the gate signal is set to 0. Further, the duty D of the gate signal is set according to numerical formula (2). Here, Vmod represents the voltage of the battery module 102, and Vmod_forced connection represents the voltage of the battery module 102 to be subjected to the forced connection.

[Numerical formula 2]

$$D = \frac{\text{Output voltage commanded} - \sum(\text{Vmod\_forced connection})}{\sum(V\text{mod}) - \sum(\text{Vmod\_forced connection})} \quad (2)$$

[SOC Estimation Processing]

Figure 9:
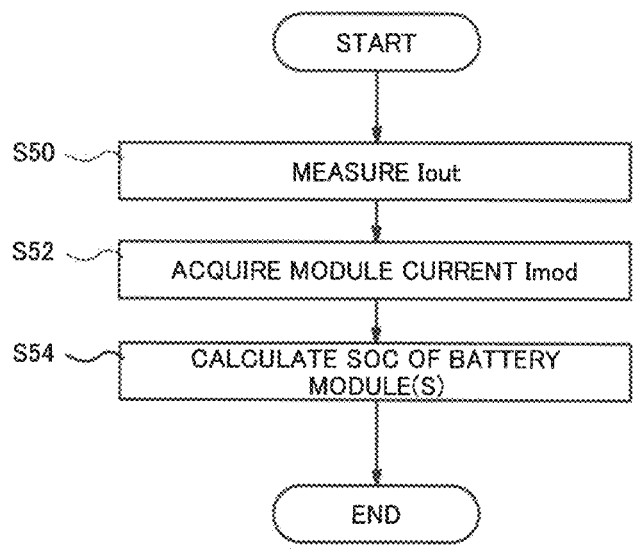
FIG. 9 is a flowchart illustrating an SOC estimation method according to an exemplary embodiment.

Hereinafter, the SOC estimation processing to be performed by the power supply device 100 will be described. FIG. 9 is a flowchart illustrating the SOC estimation processing according to the present embodiment.

In step S50, output current Iout of the power supply device 100 is measured. The control unit 104 acquires the output current Iout of the power supply device 100 measured by the current sensor 32.

In step S52, processing for estimating module current Imod of each battery module 102 is performed. The control unit 104 calculates, based on the duty ratio D, the current (module current) Imod from each of the battery modules 102 contributing to the present output. The control unit 104 acquires the output voltage (module voltage) Vmod[i] from the voltage sensor 30 for each of the battery modules 102 presently connected in series; that is, the battery modules 102 contributing to the present output. Here, i indicates the i-th battery module 102.

The duty ratio D can be calculated according to numerical formula (3). The module current Imod can be calculated according to numerical formula (4). However, the module current Imod is defined as discharging when it takes a positive value and charging when it takes a negative value.

[Numerical formula 3]

$$D = \frac{Vout}{\sum_i V\text{mod}[i]} \quad (3)$$

[Numerical formula 4]

$$I\text{mod} = Iout \times D \quad (4)$$

Although in the present embodiment the duty ratio D is used in the processing for calculating the module current Imod, the configuration may be modified to directly measure the module current Imod by providing the current sensor 32 in each battery module 102.

In step S54, processing for calculating the SOC of each battery module 102 is performed. The control unit 104 calculates the SOC of each battery module 102 based on the module current Imod obtained in step S52 according to numerical formula (5). However, Q[i] represents battery full charge capacity of the i-th battery module 102, and $SOC_{ini}[i]$ represents initial SOC at the time of starting current accumulation ($SOC_V$ obtained based on the open circuit voltage measured when the power supply device 100 is activated or in a state where charging/discharging current is 0 when the i-th battery module 102 is disconnected).

[Numerical formula 5]

$$SOC[i] = SOC_{ini}[i] - \frac{\int Imod \cdot dt}{Q[i]} \times 100 \quad (5)$$

Figure 10:
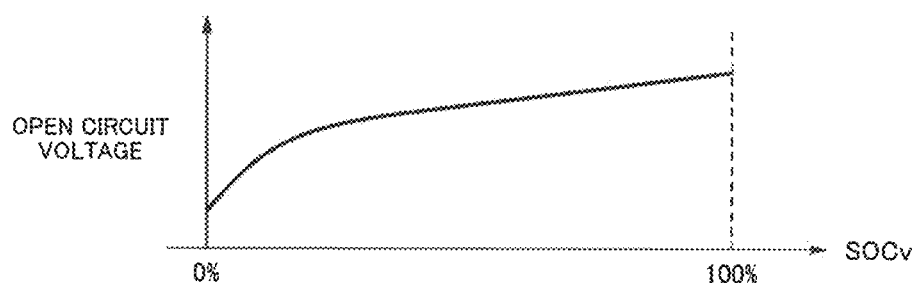
FIG. 10 illustrates an exemplary relationship between open circuit voltage of the battery module and SOC.

The relationship between the open circuit voltage of the battery module 102 and the SOC is a one-to-one relationship illustrated in FIG. 10. That is, when the open circuit voltage of the i-th battery module 102 is measured, the $SOC_{ini}[i]$ can be obtained based on the measured open circuit voltage.

Figure 11:
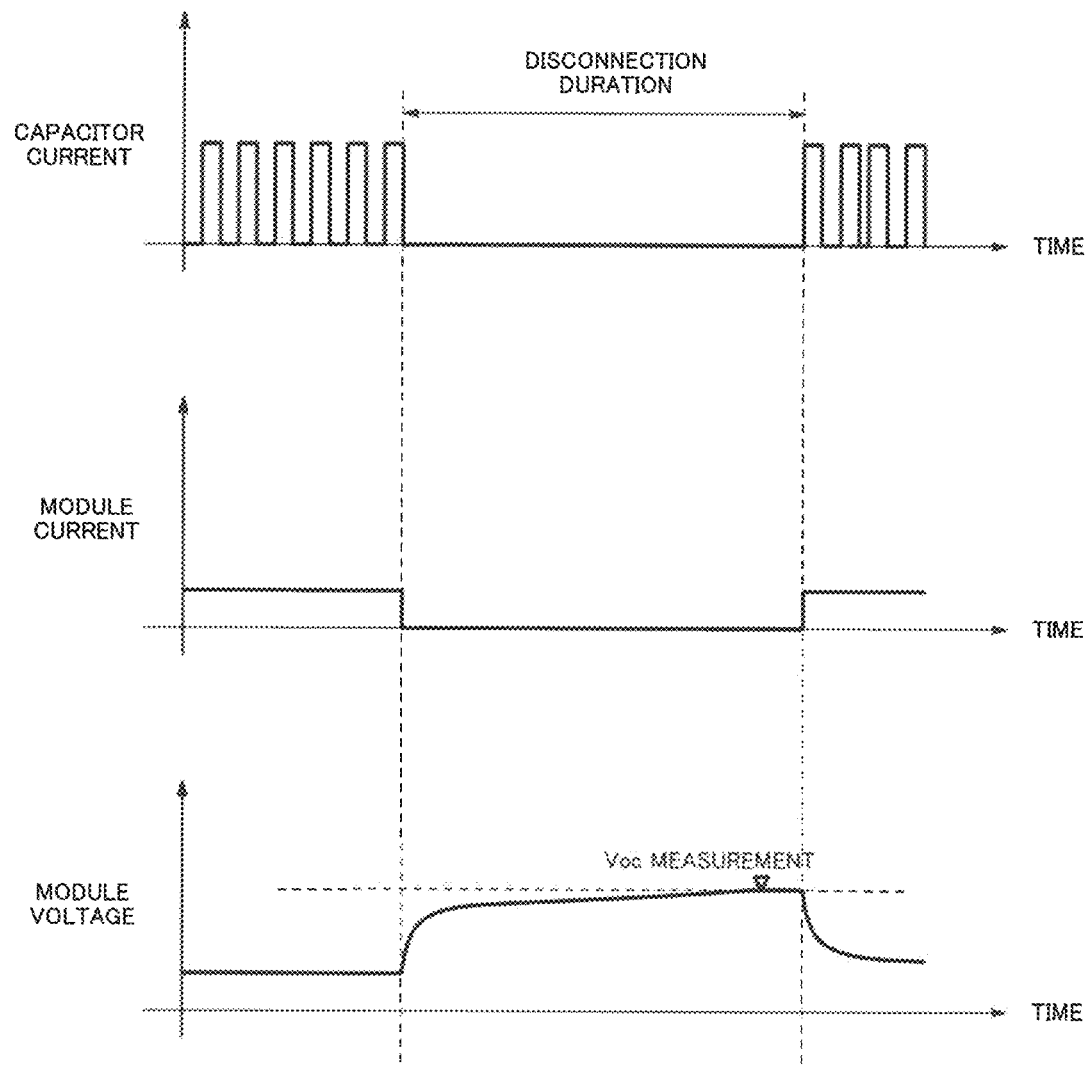
FIG. 11 illustrates a method for measuring the open circuit voltage of the battery module according to an exemplary embodiment.

Hereinafter, a method for measuring the open circuit voltage at the time of disconnecting the battery module 102 will be described. As described above, in the state of normal control, the forced disconnection signal is set to high (H) level for all the battery modules 102. However, for example, in a situation where the duty ratio D is low (a situation where a required output voltage can be output even when there is a constantly disconnected battery module 102 because the required number of the battery modules 102 to be connected to a load is smaller, the forced disconnection signal for a specific battery module 102 is set to low (L) level) As a result, the specific battery module 102 is brought into a state where it is disconnected from the load (disconnection duration in FIG. 11).

When the specific battery module 102 is disconnected from the load, the module current Imod of the battery module 102 becomes 0. Accordingly, the control unit 104 can acquire the open circuit voltage from the voltage sensor 30 of this battery module 102. As a result, the control unit 104 can obtain the SOC corresponding to the open circuit voltage acquired based on the relationship between the open circuit voltage and the SOC illustrated in FIG. 10.

The measurement of the open circuit voltage may be performed when a predetermined time has elapsed because the terminal voltage is already stable even after the battery module 102 is disconnected from the load. Alternatively, a model of voltage behavior following the stop of charging/discharging may be used to estimate the open circuit voltage from a voltage not yet stabilized, as discussed in the prior art.

As described above, even in the state where electric power is supplied to the load, the open circuit voltage can be measured by disconnecting the battery module 102 from the load. Accordingly, the SOC of the specific battery module 102 can be obtained using the measured open circuit voltage, and the $SOC_{ini}[i]$ in the numerical formula (5) can be replaced. At this time, it is preferable to reset the current accumulation of the numerical formula (5) to 0.

In the estimation of the SOC based on the accumulation value of the module current using the numerical formula (5), there is a tendency that errors are accumulated in the accumulated value due to the influence of measurement errors of the current sensor 32 or the like. However, appropriately updating the $SOC_{ini}[i]$ being the initial value based on the open circuit voltage can suppress the influence of errors and can improve the accuracy in estimation of the SOC.

In the present embodiment, the processing for measuring the open circuit voltage and estimating the SOC based on the measured open circuit voltage is performed for each battery module 102. However, the processing may be modified to collectively measure the open circuit voltage for the plurality of battery modules 102 and estimate the SOC of the plurality of battery modules 102 from the measured open circuit voltage.

REFERENCE SIGNS LIST

10: battery, 12: choke coil, 14: capacitor, 16: first switch element, 18: second switch element, 20: delay circuit, 22: AND element, 24: OR element, 26: NOT element, 30: voltage sensor, 32: current sensor, 34: voltage sensor, 100: power supply device, 102 (102a, 102b, . . . 102n): battery module

The invention claimed is:

1. A power supply device, including a plurality of battery modules having secondary batteries, wherein the battery modules are mutually connected in series and successively receive a gate signal commonly provided from a control unit to the battery modules with a different amount of delay, the gate signal is either a logical high or logical low signal that determines a duty cycle and controls a switching element in each of the battery modules, and the gate signal in each of the battery modules passes through a disconnection/connection element before reaching the switching element, the disconnection/connection element for forcibly disconnecting one or more of the battery modules from the series connection regardless of provision of the gate signal, wherein the disconnection/connection element is constituted of an AND element and an OR element and receives a separate control signal that is either a logical high or logical low signal from the control unit, and at the time of powering by power supply output, one or more of the battery modules are forcibly disconnected from the series connection by the control signal received by the disconnection/connection element, thereby performing control to make accumulated discharge current amounts thereof per unit time become smaller than those of other battery modules.

2. The power supply device according to claim 1, wherein a phase difference is provided to the gate signal for driving respective battery modules, and when the gate signal is successively transmitted to each one of the battery modules with a different delay time, one or more of the battery modules are connected to or disconnected from the series connection.

3. The power supply device according to claim 1, wherein the AND element in the disconnection/connection element is used to forcibly disconnect the one or more of the battery modules from the series connection.

4. The power supply device according to claim 1, wherein the disconnection/connection element is provided between a delay circuit for the gate signal and the switching element in each of the battery modules.

5. A power supply device, including a plurality of battery modules having secondary batteries, wherein the battery modules are mutually connected in series and successively receive a gate signal commonly provided from a control unit to the battery modules with a different amount of delay, the gate signal is either a logical high or logical low signal that determines a duty cycle and controls a switching element in each of the battery modules, and the gate signal in each of the battery modules passes through a disconnection/connection element before reaching the switching element, the disconnection/connection element for forcibly connecting one or more of the battery modules to the series connection regardless of provision of the gate signal, wherein the disconnection/connection element is constituted of an AND element and an OR element and receives a separate control signal that is either a logical high or logical low signal from the control unit, and at the time of regeneration by power supply output, one or more of the battery modules are forcibly connected to the series connection by the control signal received by the disconnection/connection element, thereby performing control to make accumulated charge current amounts thereof per unit time become larger than those of other battery modules.

6. The power supply device according to claim 5, wherein
a phase difference is provided to the gate signal for driving respective battery modules, and
when the gate signal is successively transmitted to each one of the battery modules with a different delay time, one or more of the battery modules are connected to or disconnected from the series connection.

7. The power supply device according to claim 5, wherein the OR element in the disconnection/connection element is used to forcibly connect the one or more of the battery modules to the series connection.

8. The power supply device according to claim 5, wherein the disconnection/connection element is provided between a delay circuit for the gate signal and the switching element in each of the battery modules.

9. A power supply device, including a plurality of battery modules having secondary batteries, wherein the battery modules are mutually connected in series and successively receive a gate signal commonly provided from a control unit to the battery modules with a different amount of delay, the gate signal is either a logical high or logical low signal that determines a duty cycle and controls a switching element in each of the battery modules, and the gate signal in each of the battery modules passes through a disconnection/connection element before reaching the switching element,
the disconnection/connection element for forcibly disconnecting one or more of the battery modules from the series connection regardless of provision of the gate signal, wherein the disconnection/connection element is constituted of an AND element and an OR element and receives a separate control signal that is either a logical high or logical low signal from the control unit, and
at the time of regeneration by power supply output, one or more of the battery modules are forcibly disconnected from the series connection by the control signal received by the disconnection/connection element, thereby performing control to make accumulated charge current amounts thereof per unit time become smaller than those of other battery modules.

10. The power supply device according to claim 9, wherein
a phase difference is provided to the gate signal for driving respective battery modules, and
when the gate signal is successively transmitted to each one of the battery modules with a different delay time, one or more of the battery modules are connected to or disconnected from the series connection.

11. The power supply device according to claim 9, wherein
the AND element in the disconnection/connection element is used to forcibly disconnect the one or more of the battery modules from the series connection.

12. The power supply device according to claim 9, wherein
the disconnection/connection element is provided between a delay circuit for the gate signal and the switching element in each of the battery modules.

13. A power supply device, including a plurality of battery modules having secondary batteries, wherein the battery modules are mutually connected in series and successively receive a gate signal commonly provided from a control unit to the battery modules with a different amount of delay, the gate signal is either a logical high or logical low signal that determines a duty cycle and controls a switching element in each of the battery modules, and the gate signal in each of the battery modules passes through a disconnection/connection element before reaching the switching element,
the disconnection/connection element for forcibly connecting one or more of the battery modules to the series connection regardless of provision of the gate signal, wherein the disconnection/connection element is constituted of an AND element and an OR element and receives a separate control signal that is either a logical high or logical low signal from the control unit, and
at the time of powering by power supply output, one or more of the battery modules are forcibly connected to the series connection by the control signal received by the disconnection/connection element, thereby performing control to make accumulated discharge current amounts thereof per unit time become larger than those of other battery modules.

14. The power supply device according to claim 13, wherein
a phase difference is provided to the gate signal for driving respective battery modules, and
when the gate signal is successively transmitted to each one of the battery modules with a different delay time, one or more of the battery modules are connected to or disconnected from the series connection.

15. The power supply device according to claim 13, wherein
the OR element in the disconnection/connection element is used to forcibly connect the one or more of the battery modules to the series connection.

16. The power supply device according to claim 13, wherein
the disconnection/connection element is provided between a delay circuit for the gate signal and the switching element in each of the battery modules.

\* \* \* \* \*